Jan. 29, 1963  O. A. BECKLUND ET AL  3,076,095
METHOD AND APPARATUS FOR DETERMINING ALTITUDE
Filed Sept. 5, 1956  6 Sheets-Sheet 1

INVENTORS
ORVILLE A. BECKLUND
ROBERT G. HOCH
HUBERT W. TERBUSH
ALBERT W. WORTHAM

BY  Samuel M. Mims Jr.
ATTORNEY

RETICLE 29 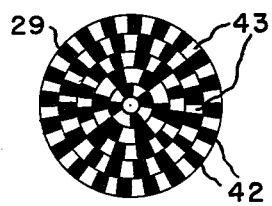
RETICLE 30 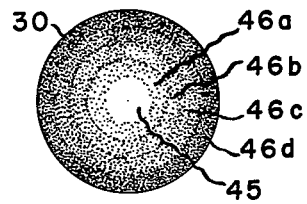
FIG. 3
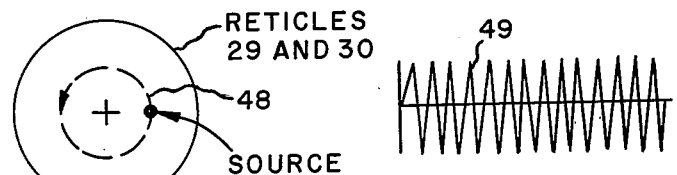
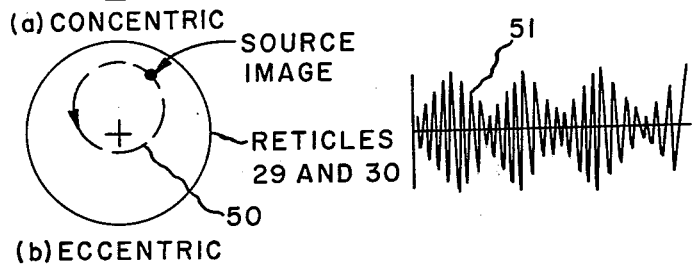
FIG. 4

Jan. 29, 1963 O. A. BECKLUND ET AL 3,076,095
METHOD AND APPARATUS FOR DETERMINING ALTITUDE
Filed Sept. 5, 1956 6 Sheets-Sheet 4
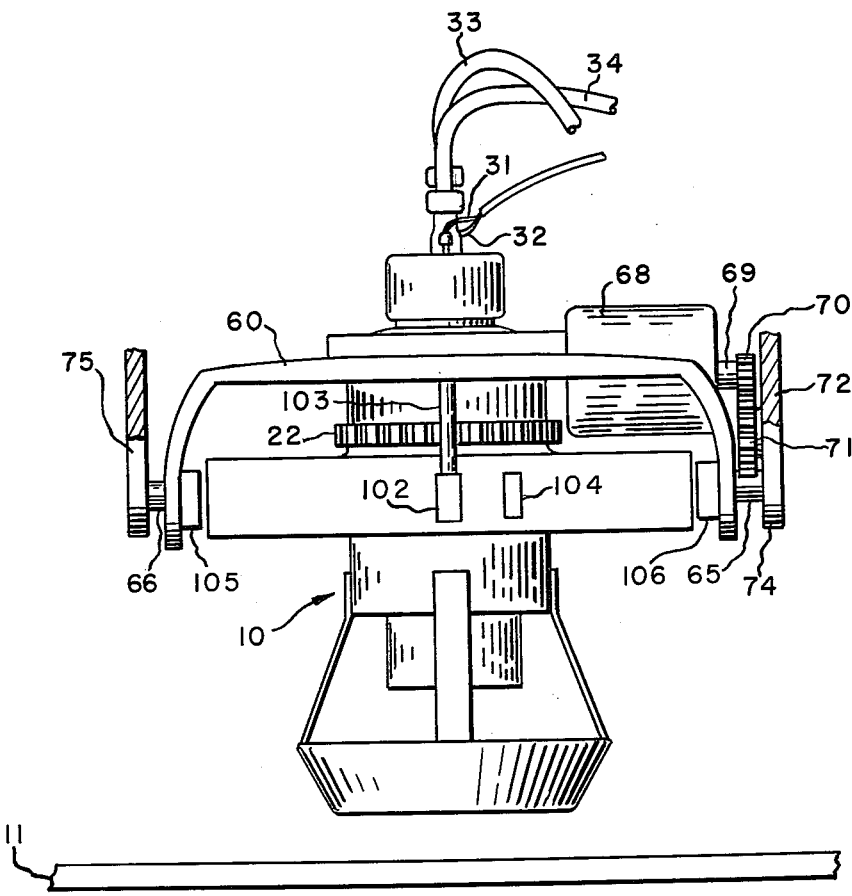
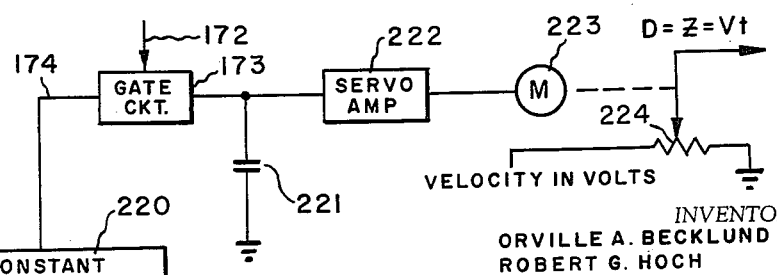
INVENTORS
ORVILLE A. BECKLUND
ROBERT G. HOCH
HUBERT W. TERBUSH
ALBERT W. WORTHAM
BY Samuel M. Mims Jr.
ATTORNEY

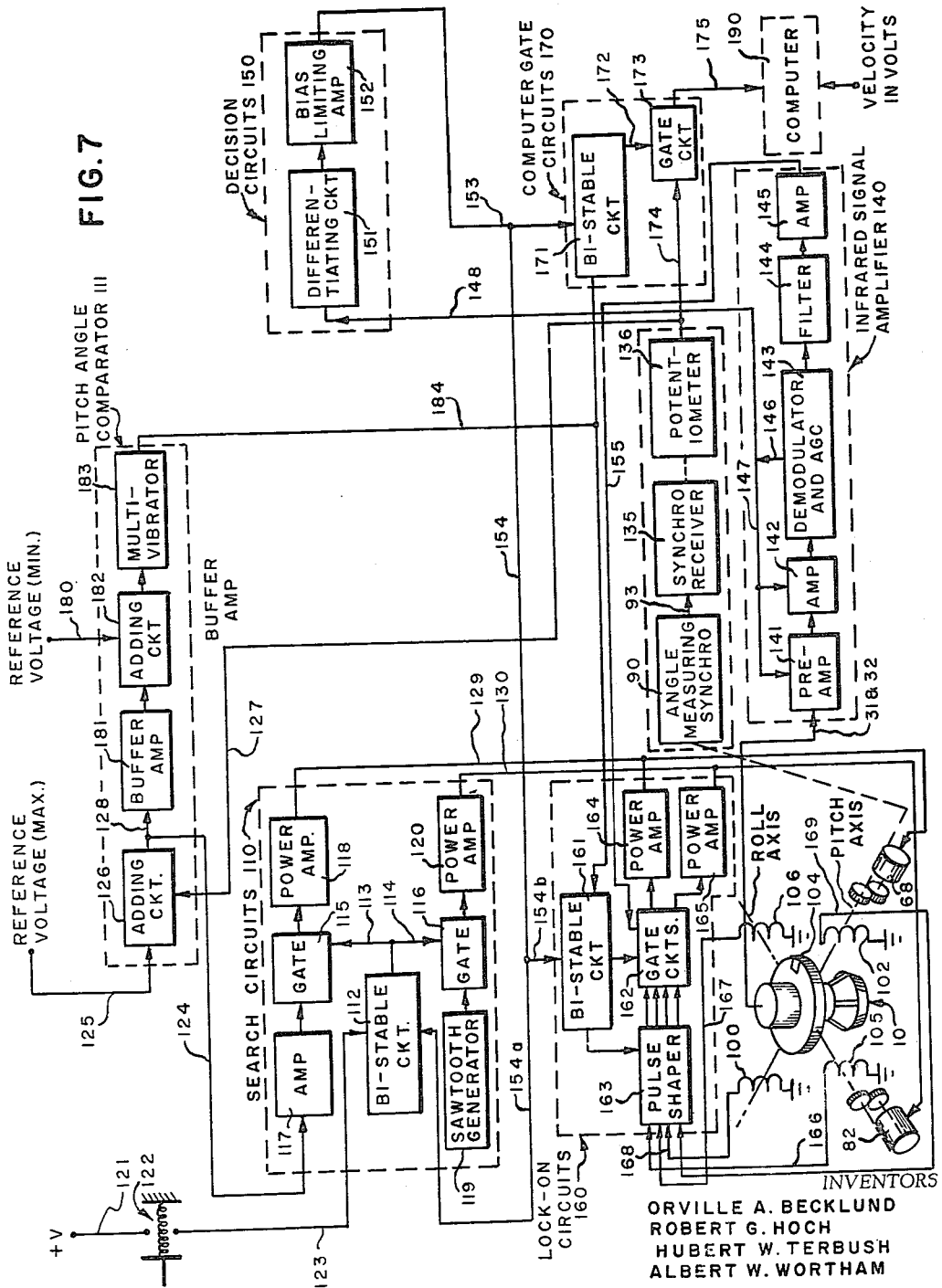

INVENTORS
ORVILLE A. BECKLUND
ROBERT G. HOCH
HUBERT W. TERBUSH
ALBERT W. WORTHAM

BY *Samuel M. Mims Jr.*
ATTORNEY 3,076,095
METHOD AND APPARATUS FOR DETERMINING ALTITUDE
Orville A. Becklund and Robert G. Hoch, Dallas, Hubert W. Terbush, Arlington, and Albert W. Wortham, Dallas, Tex., assignors, by direct and mesne assignments of one-half to Texas Instruments Incorporated, Dallas, Tex., a corporation of Delaware, and one-half to Ling-Temco-Vought, Inc., Dallas, Tex., a corporation of Delaware
Filed Sept. 5, 1956, Ser. No. 608,651
15 Claims. (Cl. 250—203)

This invention relates to a method and apparatus for determining the altitude of an aircraft, missile or the like. More particularly, this invention relates to a method and apparatus for detecting externally produced radiant energy, for example infrared, and obtaining therefrom a time function which, in conjunction with the known velocity of an aircraft or missile, may be used in computing its altitude. The method and apparatus of this invention constitutes what is sometimes referred to hereinafter as a "passive" system since the radiations detected are produced by an external source rather than as part of or by the method and/or apparatus.

In instances where an aircraft is flying over mountainous terrain or land which may be several thousand feet above sea-level, it is often of great benefit for a pilot to know the altitude of his craft above land. Also in missile guidance, it is necessary to make periodic checks of the missile altitude above the land along its flight path, particularly at or near the point at which it begins its descent upon a target. Altimeters and other elevation measuring devices have been provided heretofore but these instruments are responsive to barometric pressure or other atmospheric pressure conditions and, as a consequence, give only a relative indication of altitude above sea-level. Under certain conditions, visible light waves may be employed for determining altitude but in the case of dense fog, adverse atmospheric conditions or the lack of radiated or reflected visible light waves, such waves are not available for this purpose. Infrared waves, however, are not subject to the limitations of visible light waves in at least two ways. First, infrared waves at certain frequencies are able to penetrate haze and, therefore, provide detectable information under adverse weather conditions. And second, infrared waves are produced by any heated object and thus infrared radiation is available even though there may be no visible light waves.

Systems utilizing infrared rays are known in the prior art for measuring distance in the form of elevation of an aircraft above the ground. In such systems, an infrared ray lamp or a light source, a major portion of whose spectral energy is within the infrared range, is fixed at one portion of an aircraft to send a slender directive beam of spectral energy to the ground. Located along a line constituting the base of a triangle, and at a known distance from the directive beam of energy, is a rotating or pivotable angle measuring device. Since the angle of the beam of infrared energy is fixed with respect to the baseline and the length of the baseline is known, the elevation of the aircraft above ground is a direct trigonometric function of the infrared wave reflection angle measured by the rotating or pivotable angle measuring device. These systems are subject to certain limitations since, in the first place, the infrared waves directed toward the ground are attenuated over a path substantially equivalent to twice the elevation of the airplane above ground. Further, the coefficient of reflection of the earth is in the neighborhood of 0.1 and thus, only about 10% of the infrared energy striking the ground is reflected and that portion which does reflect is random in nature rather than directive. Thus, in order to be effective, these systems must transmit a large amount of infrared energy and the detectors must be highly sensible. Of course, inaccuracies in altitude measurement result from the relatively short baseline and the very small angles at higher altitudes. Additionally, it is highly desirable in military application for an aircraft or missile to be able to determine its altitude without, as part of the altitude determining procedure, having to transmit radiations in any form. In other words, it is highly desirable for an aircraft or a missile to determine its altitude by passive means which uses externally transmitted radiations.

To alleviate the above mentioned limitations, the present invention provides a passive method and apparatus for determining the altitude of an aircraft, missile or the like, moving at a known velocity, by the detection of radiant energy. Although the invention finds its most particular use in detecting infrared radiations and is described hereinafter in such terms, it is not to be considered as limited thereto since wave lengths in the visible light and shorter wave length regions may be utilized within the teachings of this invention. The altitude determining system of this invention is designed principally for installation in an aircraft or missile but it is susceptible of other uses. For instance, it may form part of a ground installation and, in combination with velocity measuring means, used to determine the altitude of approaching aircraft or missiles.

In the detection of radiations, a detector is used which comprises an optical system for focusing radiant energy upon a photo-conductive or a photo-voltaic semiconductor. The detector optical system is gyroscopically mounted, that is, the optical system is so supported as to permit rotation at a high velocity and the optical system support is in turn mounted in a pair of gimbals to allow movement about a roll axis as well as a pitch axis. Infrared information in usable form is provided by spinning the optical system on an axis displaced from the optical axis thereby to modulate optically the detected energy.

Prior to detecting infrared energy, the detector is positioned to scan about the roll axis in a plane directed at a pitch axis angle, normally 45°, from the vertical. Whenever radiant energy is detected, the scanning operation is stopped and the detector is controlled to follow the infrared source. Thus, if the infrared source is on the ground, the detector system in the aircraft or missile is controlled to remain focused upon the source as the aircraft or missile moves towards a vertical plane through the source. Alternatively, in a ground installation, the system is stationary and the detector is focused upon an aircraft or missile as it moves towards the vertical plane of the detector installation. Throughout the period during which the detector is focused upon the source, angle information as a function of time is fed to a computer which, together with the velocity of the aircraft or missile, determines therefrom the aircraft or missile altitude. In one embodiment, the time function of the angle information is time rate of change of the angle and, in other embodiments, is a measure of the time required for the detector to rotate through a predetermined angle.

Accordingly, it is an object of this invention to provide a passive altitude determining system suitable for military as well as for non-military use.

It is another object of this invention to provide a passive system for determining the altitude of an aircraft, missile or the like by the detection of radiant energy.

It is a further object of this invention to provide a passive system for determining the altitude of an aircraft or missile by the detection of infrared radiations.

It is another object of this invention to control a radiant energy detector to follow a source of radiant energy and to obtain angle information therefrom as a function of time which, in combination with velocity, may be used in computing the altitude of an aircraft or missile.

It is still another object of this invention to provide an optically modulated infrared detector controlled to follow a source of infrared radiations through an angle whereby information is obtained as a function of the time rate of change of an angle which information, together with the velocity of an aircraft or missile, may be used to compute its altitude.

It is still a further object of this invention to provide an optically modulated infrared detector controlled to follow a source of infrared radiations through an angle whereby information is obtained as a function of the time required for the detector to rotate through a predetermined angle which information, together with the velocity of an aircraft or missile, may be used to compute its altitude.

The above objects will be clarified and other objects made known from the following discussion when taken in conjunction with the drawings in which:

FIGURE 1 is a space diagram representative of the operations performed by the altitude determining system of this invention when installed in an aircraft, missile or the like;

FIGURE 3 is an enlarged view of the radiation chopping reticle and the radiation modulating reticle, forming part of the detector optical system shown in FIGURE 2;

FIGURE 4 is an illustration of the output from the optical system (a) when the infrared source image path is concentric with the spin axis of the optical system and (b) when the infrared source image path is eccentric to the spin axis of the optical system;

FIGURE 6 is a side elevation view of FIGURE 5 taken along line 6—6 except that, in FIGURE 6, the detector is shown in a vertical position;

FIGURE 7 is a block diagram of the detector search and control circuit components and angle information input circuit components to the computer;

FIGURE 9 is a schematic diagram of another embodiment of the computer of this invention.

Figure 1:
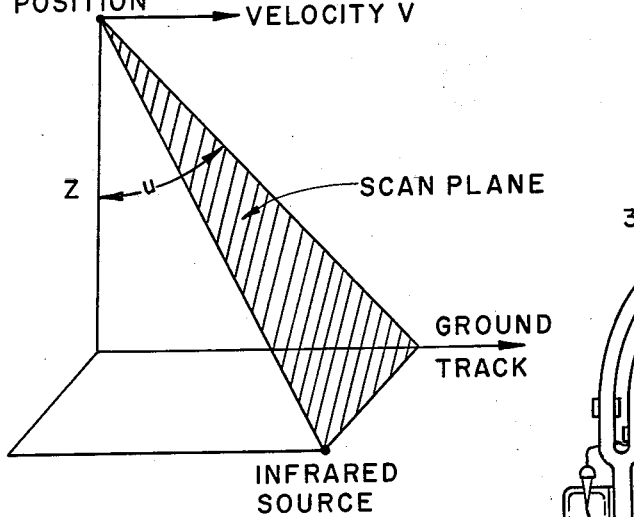

Referring now to the drawings, FIGURE 1 illustrates by means of a space diagram the operation of the altitude determining system of this invention when installed in an aircraft or missile. As shown, an aircraft or missile is flying at a known velocity V and at an altitude Z to be determined. A detector installed therein is positioned about the pitch axis at an angle $u$ from the vertical and is maintained at this angle while the detector is pivoted about the roll axis to scan in a plane indicated by the shaded portion. The scanning proceeds along the ground track until an infrared source is detected within the scan plane whereupon the scanning is stopped instantaneously and the detector controlled to follow the infrared source as the aircraft or missile moves relative to the stationary source. When the aircraft or missile is in a given position, which may or may not be in a vertical plane through the infrared source, the following operation is stopped. The altitude Z is computed from a time function of the angle $u$ and the velocity V and, if desired, the detector returned to the angle $u$ from the vertical and scanning recommenced. The detection, control and computation functions indicated in FIGURE 1 will be discussed hereinafter in connection with FIGURES 2 through 9.

Figure 2:
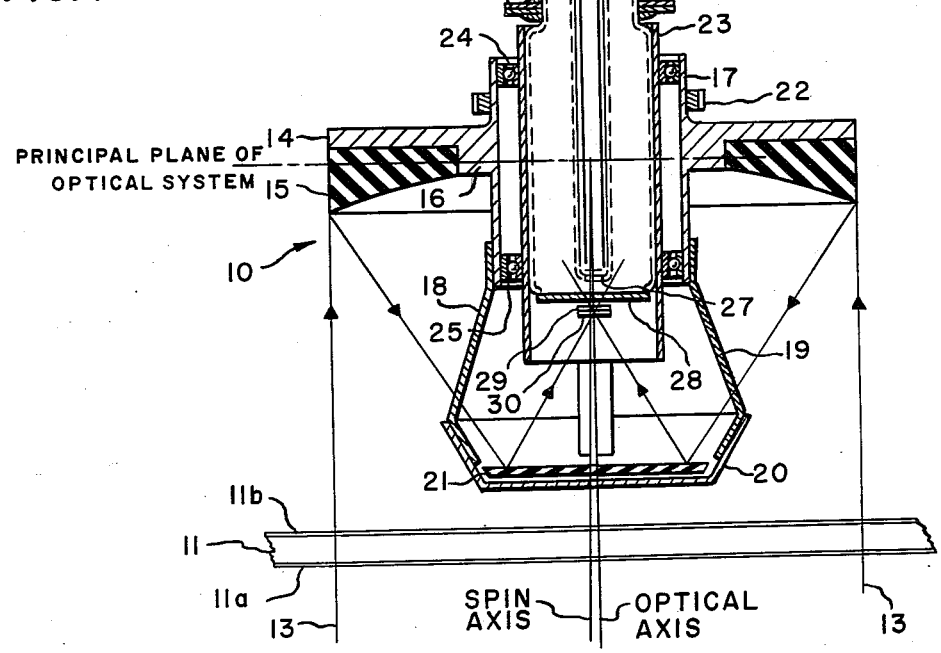
FIGURE 2 is a sectional view in elevation of a detector illustrating primarily the optical system of the detector.

The detector optical system which detects an infrared source and produces an electrical signal indicative thereof is shown in FIGURE 2. The detector is designated generally by the numeral 10. In FIGURE 2, infrared waves radiating from some source fall first upon the optical window 11. Optical window 11 is a plane silicon crystal with width and length dimensions sufficient to permit detection of radiations over a desired scan plane and any predetermined pitch angle $u$. The thickness dimension of window 11 is about 0.2 inch. Window 12 is bonded into the air frame closure structure, not shown, in a position exposed to infrared radiations. Silicon provides an ideal window for infrared radiations since it is opaque to ultra-violet, visible light and very near infrared rays up to 1.2 microns in length and is essentially transparent to the longer wave lengths of infrared. Silicon transmits approximately 53% to 55% of the radiation wave lengths between 1.2 microns and 7 microns, the amount transmitted depending upon the wave lengths of the incident radiations and the temperature of the silicon. In order to maximize the transmission characteristics of silicon over the wave lengths of interest, anti-reflection coatings 11a and 11b are coated on either side of the window 12. Such coatings may be of arsenic trisulfide or titanium dioxide and, when coated on the silicon in thicknesses of one quarter wave length or multiples of a one quarter wave length at the desired frequency, a transmission efficiency of 90% or greater may be achieved for wave lengths over a 2 micron band and of about 80% for wave lengths over a 4 micron band. It should be recognized that, if it is desired to detect radiant energy in the very near infrared, visible or ultra-violet wave lengths regions, some optical window such as glass can be substituted for the silicon window 11.

In the detector optical system, the primary mirror is spherical mirror 15. Mirror 15 is formed with a central aperture of sufficient diameter to fit over the hub portion 16 of a circular plate 14. Plate 14 is open throughout a concentric, cylindrical portion and extending therethrough and affixed to hub 16 is a cylindrical sleeve 17. Attached to one end of sleeve 17 are struts 18 and 19 which support the dish-shaped member 20 and plane mirror 21. Mirror 21 is supported by member 20 in such a manner that its reflecting surface faces the reflecting surface of spherical mirror 15. At the other end of sleeve 17 is a ring gear 22 securely affixed thereto. Such combination of components constitutes the mirror assembly of the optical system.

A cylindrical tube 23 is inserted within sleeve 17 and is separated therefrom by a pair of ball bearings 24 and 25, one at either end of sleeve 17. The outer races of ball bearings 24 and 25 are secured to sleeve 17 while the inner races are secured to tube 23, thus permitting relative rotation between the mirror assembly and sleeve 23. The ball bearings 24 and 25, sleeve 17 and tube 23 are so arranged that the spin axis for the mirror assembly is displaced from the optical axis, in this embodiment, one (1) degree. Dewar tube 26, of a type well known in the art, is inserted within tube 23 in a forced fit relationship. Dewar tube 26 is essentially cylindrical in shape and closed at both ends with one of the closures being effected by a sapphire window 28. Supported from sapphire window 28 and centrally disposed with respect to the optical axis are two reticles, 29 and 30. Interior of Dewar tube 26 and in line with reticles 29 and 30 is a detector cell 27 positioned closely adjacent to sapphire window 28. Detector cell 27 is supported at the end of cryostat 35 through which a coolant, for example nitrogen, flows. The interior construction of cryostat 35 is not shown since it is not per se part of this invention. It is sufficient to note that, in cryostat 35, gaseous nitrogen enters under pressure and, after expansion, changes to the liquid state at or near detector cell 27. After picking up heat, the nitrogen changes once again to the gaseous state and leaves cryostat 35 at a low pressure. The inlet and outlet connections to cryostat 35 are provided by tubes 33 and 34, respectively. Electrical connection to detector cell 27 is made through leads 31 and 32 which extend through the closed end of Dewar tube 26 and along cryostat 35 to either side of detector cell 27. Outside of tube 23 is a flange member 36 secured to Dewar tube 26 and to the yolk gimbal shown in FIGURES 5 and 6. Infrared radiations, typified by the rays 13, are transmitted in a refracted path through window 11, and are collected by spherical mirror 15. From the spherical mirror, the rays are reflected first to plane mirror 21 and thence through reticles 29 and 30 and sapphire window 28 to the detector cell 27.

Dimensions and optical criteria for the above described optical assembly are as follows. Spherical mirror 15 is 4.0 inches in diameter and has a radius of curvature of 7.3 inches. With this radius of curvature, rays reflecting from the spherically concave surface are focused at a length of 3.6 inches from the principal plane of the optical system and, thus, mirror 21 may be located at a distance of 2.36 inches from the principal plane with the junction between the reticles 29 and 30 located at a distance of 1.22 inches from plane mirror 21. With these dimensions, radiations from a 4° field of view are focused at the junction between the two reticles and the image thereof covers an area whose diameter is equal to 0.25 inch. A nutation circle of 2° is traced on the reticles by the 1° displacement of the spin axis from the optical axis. As a result of this displacement, the reticles are made 0.289 inch in diameter to accommodate lateral movement of the entire field of view. The detector cell 27 is provided with a sensitive area of 5 mm. x 5 mm. In this particular embodiment a sapphire window is used because sapphire has a good transmission efficiency for wave lengths in the infrared region. The dimensions given above are not to be construed as a limitation on this invention since it is possible to design any number of optical systems each with different radius of curvature, focal length, field of view, diameter of nutation circle, etc.

The reticles 29 and 30, in order to be transparent to infrared radiations, are silicon disks and together constitute a radiation chopping and modulation arrangement. As shown in FIGURE 3, an opaque pattern is deposited on one surface of reticle 29 so as to produce opaque areas 42 alternating with radiation transparent areas 43. As the source image follows a circular path on the face of reticle 29, it is the function of the alternating opaque and transparent pattern to interrupt the transmission of radiation at a constant rate regardless of where on its face the circle is traced. Thus, rather than the checker-square pattern shown, the pattern deposited on reticle 29 may take any form provided that it will produce radiation chopping at a constant frequency. Reticle 30 has concentric circular strips of increasing optical density progressing from the center toward the edge. Thus, a circular area 45 in the center of the disk is completely transparent to radiation. Circular strip 46a, concentric with circular area 45, is slightly dense and successive concentric strips, 46b, 46c, and 46d increase in density until at the outer edge, reticle 30 is essentially opaque to the transmission of radiations. The effect of this pattern is to modulate the radiation beam cyclically with each trip of the image about the circular path.

To illustrates the pattern combination on reticle 29 and reticle 30, reference is now made to FIGURES 4(a) and 4(b). For the condition of FIGURE 4(a), that is, where radiations are falling on reticles 29 and 30 and the source of radiations is aligned with the spin axis of the optical system, the source image describes a circle concentric with the centers of the two reticles as indicated by the circle 48. The chopping action of the checker-square pattern of reticle 29 produces a constant amplitude A.C. signal 49 and reticle 30 imposes no modulation thereon because the concentric path lies in one of the uniform density circular strips. However, when the source no longer coincides with the spin axis of the optical system, the radiations are focused on a different portion of reticles 29 and 30 and an eccentric path 50, shown in FIGURE 4(b), is traced on the reticles with each revolution of the optical system. Thus, besides the chopping action of reticle 29, there is also superimposed on the output a variation due to reticle 30 because the path no longer stays within one of the uniform density strips. As a result, signal 49 is amplitude modulated to produce the signal 51. Signals 49 and 51 are transmitted as indicated previously through sapphire window 28 to detector cell 27, a photosensitive semiconductor.

Photosensitive semiconductors may be either photovoltaic or photo-conductive in type. Photo-conductive devices, comprised for example of lead telluride, exhibit the property of decreased resistance in the presence of radiation. Photo-voltaic semiconductors, typified by indium antimonide photocells, contain a p-n junction and create, upon the incidence of radiation, a potential difference across the p-n junction. Although lead telluride cells may be used, the preferred embodiment of this invention utilizes a detector cell comprised of indium antimonide. Detector cell 27 produces a voltage corresponding to the radiations incident thereupon, that is, a voltage corresponding to signal 49 or 51 as transmitted by the reticles 29 and 30. Leads 31 and 32, connected to either side of detector cell 27, conduct the voltage output (or equivalent) of the cell to an infrared signal amplifier, discussed hereinafter in connection with FIGURE 7.

Figure 5:
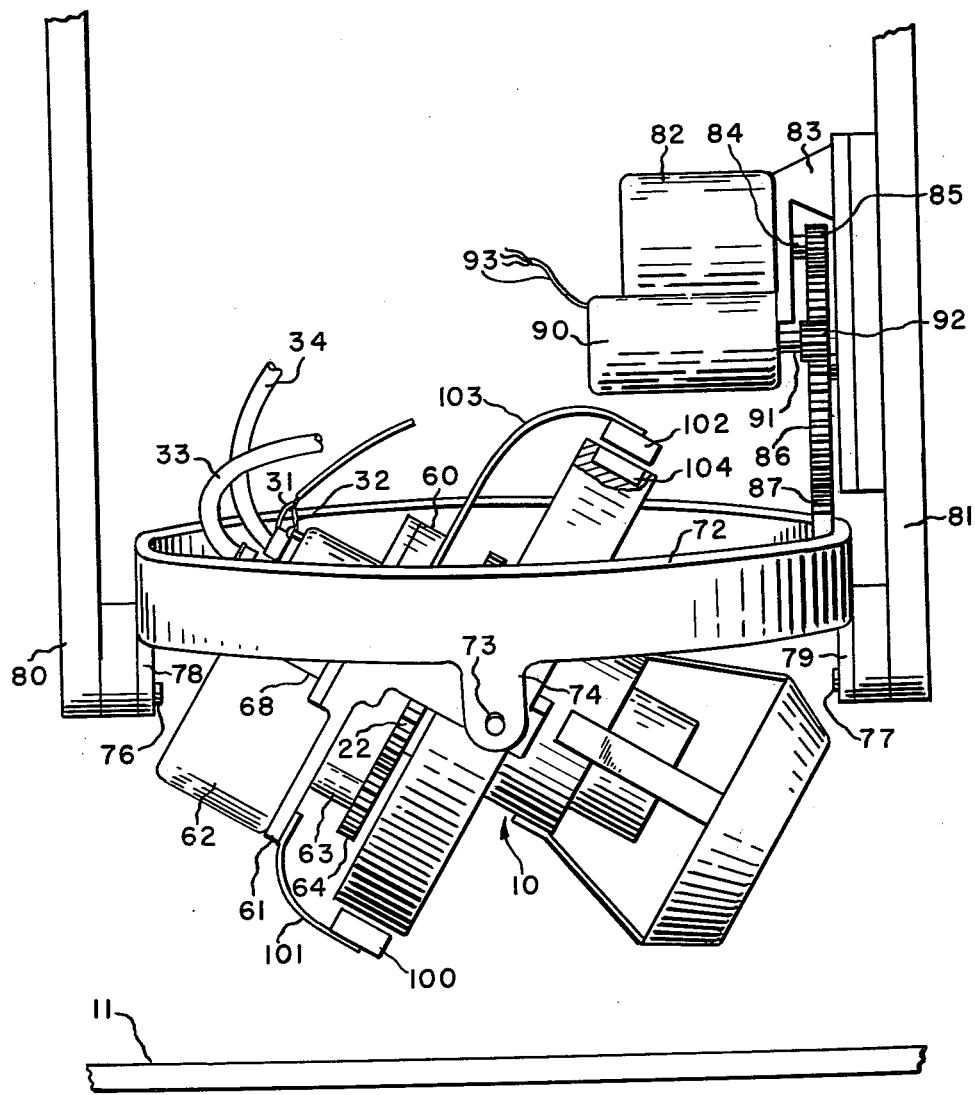
FIGURE 5 is a front perspective view of a gyroscopically mounted detector with the detector positioned to the right for the purposes of clarity.

A detector of the type discussed above is gyroscopically mounted as shown in the partly perspective front elevation view of FIGURE 5 and in the side elevation sectional view of FIGURE 6. The detector is shown positioned to the right in FIGURE 5 for the purposes of clarity whereas, in FIGURE 6, it is positioned vertically downward. Detector 10 is centrally disposed between the legs of a U-shaped gimbal yolk 60 and is supported therefrom by the flange 36 of Dewar tube 26 attached to the yolk. An extended arm 61 of yolk 60 supports a spin motor 62. Shaft 63 is driven by spin motor 62 and affixed to the end thereof is a pinion gear 64 in engagement with ring gear 22.

Yolk 60 is pivotably connected to pitch axis gimbal ring 72 by means of pins 65 and 66 connected at one end to the legs of yolk 60 and positioned at the other end within a bearing 73 and another bearing not shown. The bearings are mounted within lugs 74 and 75 integrally attached on diametrically opposite sides of gimbal ring 72. The pivotable point of support of yolk 60 to gimbal ring 72 establishes the roll axis for the detector. Pitch axis gimbal ring 72 is, in turn, pivotably supported by bearings arrangements 76 and 77. Bearing 76 pivotably interconnects lug 78 and frame member 80 and bearing 77 similarly connects lug 79 and frame member 81. Like the lugs 74 and 75, lugs 78 and 79 are integrally attached to gimbal ring 72 but disposed along an axis rotated 90° from the roll axis to thereby establish the pitch axis for the detector. Frame members 80 and 81 are attached to a stabilized platform not shown.

The drives for the detector are provided by gimbal yolk torque element 68 and pitch axis gimbal torque element 82. Torque element 68, supported by gimbal yolk 60, provides a reversible direction drive to its output shaft 69. For this purpose, torque element 68 may be a reversible type motor or a constant direction motor in combination with a pair of miniature clutches so biassed and linked together that torques can be exerted in either a forward or reverse direction dependent upon the actuating signal to the clutches. A suitable motor and clutch arrangement to provide reversible rotation is shown in Patent No. 2,651,754. Attached to the output shaft 69 of torque element 68 is a pinion gear 70. Pinion gear 70 engages with a sector gear 71 fixedly attached to the pitch axis gimbal ring 72. Torque element 82, which may be either a motor or a motor and clutch arrangement as described for torque element 68, is supported by a bracket 83 from frame member 81. A pinion gear 85 is attached to the output shaft 84 of torque element 82 and engages an idler gear 86. Idler gear engages sector gear 87 so mounted as to apply a torque about the pitch axis.

With the arrangement thus described, the mirror assembly of the detector 10 optical system is rotated at a constant velocity by spin motor 62. Moreover, detector 10 is supported by two gimbal rings whose pivot axes are disposed at 90° to each other. Then, in accordance with gyroscopic principles, when it is desired to cause the assembly to precess about the pitch axis, torque is applied by element 68 to the sector gear attached to the pitch axis gimbal. In like manner, when it is desired to cause precession about the roll axis, torque is applied by element 82 to the pitch axis.

Also shown in FIGURES 5 and 6 are elements constituting more properly a part of the detector control and angle information circuit rather than part of the gimbal mounting for the detector. One of these elements is an angle measuring synchro 90 supported by bracket 83. A pinion gear 92 engages idler gear 86. Movement of the idler gear 86 by precession in the pitch direction causes pinion 92 to rotate and the rotation of the pinion is transmitted by shaft 91 to the rotor of synchro 90. As the rotor of synchro 90 moves, voltages related thereto are transmitted by three leads, designated 93, to a synchro receiver described hereinafter in connection with FIGURE 7. Additionally, four coils, 100, 102, 105 and 106, mutually disposed 90° from each other, are positioned adjacent to the periphery of the rotating mirror 15 and separated therefrom by a small air gap. Inset within the mirror is a permanent magnet 104 which, upon rotation past the coils, induces a voltage therein. Coils 100 and 102 are supported from yolk 60 by arms 101 and 103, respectively, and coils 105 and 106 are attached to the interior portions of the legs of yolk 60. As will appear subsequently, coils 100 and 102 function in the roll axis control circuit whereas coils 105 and 106 function in the pitch axis control circuit.

Having described in FIGURES 2–6 a detector suitable for use in the altitude determining system of this invention, a discussion will be presented of the detector control and angle information circuit shown in FIGURE 7. The circuits and components involved in determining the altitude of an aircraft or missile are well known in the prior art, particularly the radar and computer arts, and it is therefore, deemed unnecessary for the purposes of this invention to show the circuits and components in detail. However, it should be mentioned that, as a design criterion of these circuits, the use of components such as transistors, magnetic cores and etched circuits is preferred.

In the period prior to the reception of infrared waves, the pitch angle $u$ and scan plane of detector 10 is controlled by the search circuits, designated generally by the numeral 110 and by a portion of the pitch angle comparator circuit, designated generally by the number 111. To activate the search circuits, a positive pulse is applied to the bi-stable or flip-flop circuit 112 to change it from a non-conducting to a conducting state. For a discussion of flip-flop circuits, see Section 13.7, vol. 1, Radiation Laboratory Series. The positive pulse to circuit 112 is supplied from a positive voltage source +V through leads 121, switch 122 and lead 123. Switch 122 is normally biassed in the open position by a spring and, thus, the pulse is supplied only when switch 122 is closed against the pressure of the spring. In place of manually operated switch 122, the pulse to circuit 112 may be provided by a programmer at preselected times or upon the occurrence of a certain event. When circuit 112 is changed from the non-conducting to the conducting state, a signal is applied through leads 113 and 114 to open gate circuits 115 and 116, respectively. With gates 115 and 116 open, a pathway is provided through lead 129 for the signals to operate torque element 68 as well as through lead 130 for the signals to operate torque element 82. It should be recognized at this point that, for purposes of clarity, torque elements 68 and 82 are shown as being directly connected to the axes of detector 10 instead of gyroscopically connected thereto as discussed above in FIGURES 5 and 6. Thus, as shown schematically, torque element 68 controls directly the pitch axis angle $u$ of detector 10 from the vertical and torque element 82 controls directly the movement of the detector in the scan plane.

The signal through lead 129 to pitch axis torque element 68 is provided in the following manner. The rotor of angle measuring synchro 90 is controlled by movements of the gimbal 72 about the pitch axis and produces thereby a voltage related to its angular position. This voltage is fed through leads 93 to a synchro receiver 135 whose rotor assumes the same angular position as the rotor of angle measuring synchro 90. Directly connected to receiver 135 is the wiper arm of a potentiometer and thus, as receiver 135 moves to the dictated angular position, the output of potentiometer 136 is a voltage determined by the pitch axis angle. This output voltage from potentiometer 136 is fed through lead 127 to adding circuit 126 of the pitch angle comparator 111. Adding circuit 126 consists of a transformer with two primary windings and one secondary winding with the primary windings wound to polarize oppositely. The potentiometer voltage through lead 127 is applied to one of the primary windings and a constant reference voltage is applied through lead 125 to the other primary winding. This reference voltage is representative of the voltage required to maintain detector 10 at a constant pitch axis angle, for example 45°. Hence, it is termed as a maximum angle voltage. An output voltage is induced in the secondary winding, which is the difference between the reference voltage and the angle measuring voltage, and applied through lead 124 to amplifier 117. This difference voltage is amplified in amplifier 117 and, since gate 115 is open, the amplified voltage is fed to power amplifier 118 and thence to the pitch axis torque element 68 by way of lead 129. As long as detector 10 is at a pitch angle different from that dictated by the reference voltage, voltage will be applied to the pitch axis torque element 68 to move detector 10, and thus the angle measuring synchro 90, towards a balanced position. This position is reached and maintained when the potentiometer voltage equals the reference voltage in adding circuit 126.

The signal to the roll axis torque element 82 is obtained from sawtooth generator 119 in the search circuits 110. The output from sawtooth generator 119 is fed through open gate 116 and into power amplifier 120. After amplification, the signal is supplied through lead 130 to roll axis torque element 82 which thereby causes detector 10 to scan in a plane over the angle set by the sawtooth generator voltage.

Upon detecting infrared radiations during the scanning operation, detector 10 produces a constant amplitude signal 49 and then an amplitude modulated signal 51 as shown in FIGURE 4. Discussing first the function and path of the constant amplitude signal, signal 49 is fed through leads 31 and 32 from detector cell 27 to preamplifier 141 and amplifier 142 in the infrared signal amplifier circuits 140. After two stages of amplification the signal is fed to the AGC and demodulator circuit 143 which is a detector of any conventional type such as a diode. In detector 143, a D.C. voltage proportional to signal level is generated for automatic gain control purposes. The AGC voltage is fed in one path by leads 146 and 147 back to preamplifier 141 and amplifier 142 to set the gain therein. In another path, the AGC voltage is fed by leads 146 and 148 to a differentiating circuit 151 in the decision circuits 150.

Circuit 151, consisting of a resistance-capacitance network, differentiates the AGC voltage and produces a positive pulse to the bias limiting amplifier 152. Bias limiting amplifier 152 is normally biassed beyond cutoff which bias is removed by the positive pulse from differentiating circuit 151. Upon conduction, an output pulse from amplifier 152 is fed simultaneously to the search circuits 110, the lock-on circuits 160, and computer gate circuits 170. Disregarding for the moment the pulse to computer gate circuits 170, the pulse from amplifier 152 feeds through leads 153 and 154 to branch leads 154a and 154b. The pulse in lead 154a is fed to bi-stable circuit 112 which causes the circuit to change to its non-conducting state. Thereupon, gates 115 and 116 close and the signals from search circuit 110 to the pitch axis and roll axis torque elements 68 and 82 are removed. By means of lead 154b, the pulse is fed to bi-table circuit 161 of lock-on circuit 160 which causes it to change to the conducting state.

With bi-stable circuit 161 in a conductive state, a signal is applied to each of four gate circuits, designated generally by the numeral 162. Gate circuits 162, however, are "AND" type circuits which require coincidence of more than one signal to open the gate. At this point, reference is made to the amplitude modulated signal 51. Signal 51 occurs subsequently to signal 49 because the infrared source, after detection, follows path 48 concentric with the spin axis and then path 50 eccentric to the spin axis. The amplitude modulated signal 51 is amplified by the AGC controlled amplifier stages 141 and 142 and fed to demodulator 143. After demodulation, unwanted noise components are removed by a bandpass filter 144 and the remaining signal is amplified in stage 145 and applied to each of the gate circuits 162 through lead 155. There the amplitude modulated signal is blocked until a coincident signal appears and opens the gates. The coincidence signal to open each gate circuit 162 is derived from coils 100, 102, 105 and 106 positioned adjacent permanent magnet 104 inset into the rotating mirror 15 of detector 10. The coils are in pairs, coils 100 and 102 providing roll axis information and coils 105 and 106 providing pitch axis information. The signal induced in coils 105, 106, 100 and 102 are each fed to separate pulse shaper circuits, designated generally as 163, by leads 166, 167, 168 and 169, respectively. Pulse shapers 163 may be either conventional squaring amplifiers or diode limiting circuits. From pulse shapers 163, gate opening pulses are fed to the circuits 162.

It can be seen that, as permanent magnet 104 rotates past each of the coils, signals are cyclically induced therein and gate circuits 162 are therefore opened cyclically. Further, since the infrared radiations are amplitude modulated during each revolution of detector 10, it can be seen that amplitude modulation of the infrared radiation, due to eccentricity between the source and the spin axis, is cyclically in phase with the pulses to the gate circuits. It follows, therefore that signals varying in amplitude will be passed through the gate circuits to power amplifiers 164 and 165 and that, when applied to the torque elements, the signals will be in such phase and amplitude as to tend to keep the detector spin axis aligned with the infrared source. Power amplifier 164 is, in effect, controlled by signal to gates 162 from pitch axis coils 105 and 106 and its output is fed through lead 129 to pitch axis torque element 68. Similarly, power amplifier 165 is controlled by signal to the other of gates 162 from roll axis control coils 100 and 102 and its output is fed through lead 130 to roll axis torque element 82. By means of the lock-on circuit described, detector 10 is, from the instant of detection of a radiation source, controlled to follow the source until a limiting angle is reached.

Returning to the actions of the circuit upon initially detecting an infrared source, it has been stated above that signal 49 results in an AGC signal to decision circuits 150 and that the output of circuits 150 is a positive pulse which is fed to three different circuits. Two of the circuits, search circuits 110 and lock-on circuits 160, have been described above. As to the remaining circuit, the positive pulse is applied through lead 153 to bi-stable circuit 171 of the computer gate circuits 170. Bi-stable circuit 171 is changed to its conductive state and, when in this condition, supplies a signal through lead 172 to open gate circuit 173. On opening, gate circuit 173 permits angle information voltage, derived from angle measuring synchro 90, synchro receiver 135 and potentiometer 136, to feed through leads 174 and 175 to the computer 190. Angle information is fed to computer 190 until such time as detector 10 reaches some limiting angle.

The limiting angle control is provided by the portion of pitch angle comparator circuit 111 not yet described. The difference voltage from adding circuit 126 is not only applied to the search circuits 110 but is also applied through lead 128 and buffer amplifier 181 to the adding circuit 182. A second reference voltage, representative of a minimum angle, is applied through lead 180 to adding circuit 182 and buffer amplifier 181 serves merely to isolate this reference voltage from the remainder of the circuit. Adding circuit 182, like circuit 126, consists of two primary windings and a secondary winding. The voltage from adding circuit 126 is applied to one primary winding and the reference voltage to the other primary winding and the difference voltage is induced in the secondary winding. The difference voltage is applied to a one shot multivibrator 183, the multivibrator circuit being essentially a modification of the basic Eccles-Jordan circuit.

The function of multivibrator 182 is to initiate a pulse only when its input drops below a predetermined small value. This value is approached as detector 10 follows an infrared source and the angle indicating voltage from potentiometer 136 decreases below the voltage of the reference (through lead 125) to adding circuit 126. The result is an increasing difference voltage from circuit 126 which begins to cancel the reference voltage to adding circuit 182 until, at complete cancellation or some pre-selected small value, multivibrator 183 flips producing thereby a pulse which is fed through lead 184 to bi-stable circuits 171 and 161. Bi-stable circuits 161 and 171 are changed to their non-conducting states and gates 162 and 173, respectively, are closed. In this condition, the source lock-on control of detector 10 is removed and the angle information to computer 190 is terminated. Detector 10 remains in the minimum pitch angle position until operation is once more initiated by closing switch 122.

Figure 8:
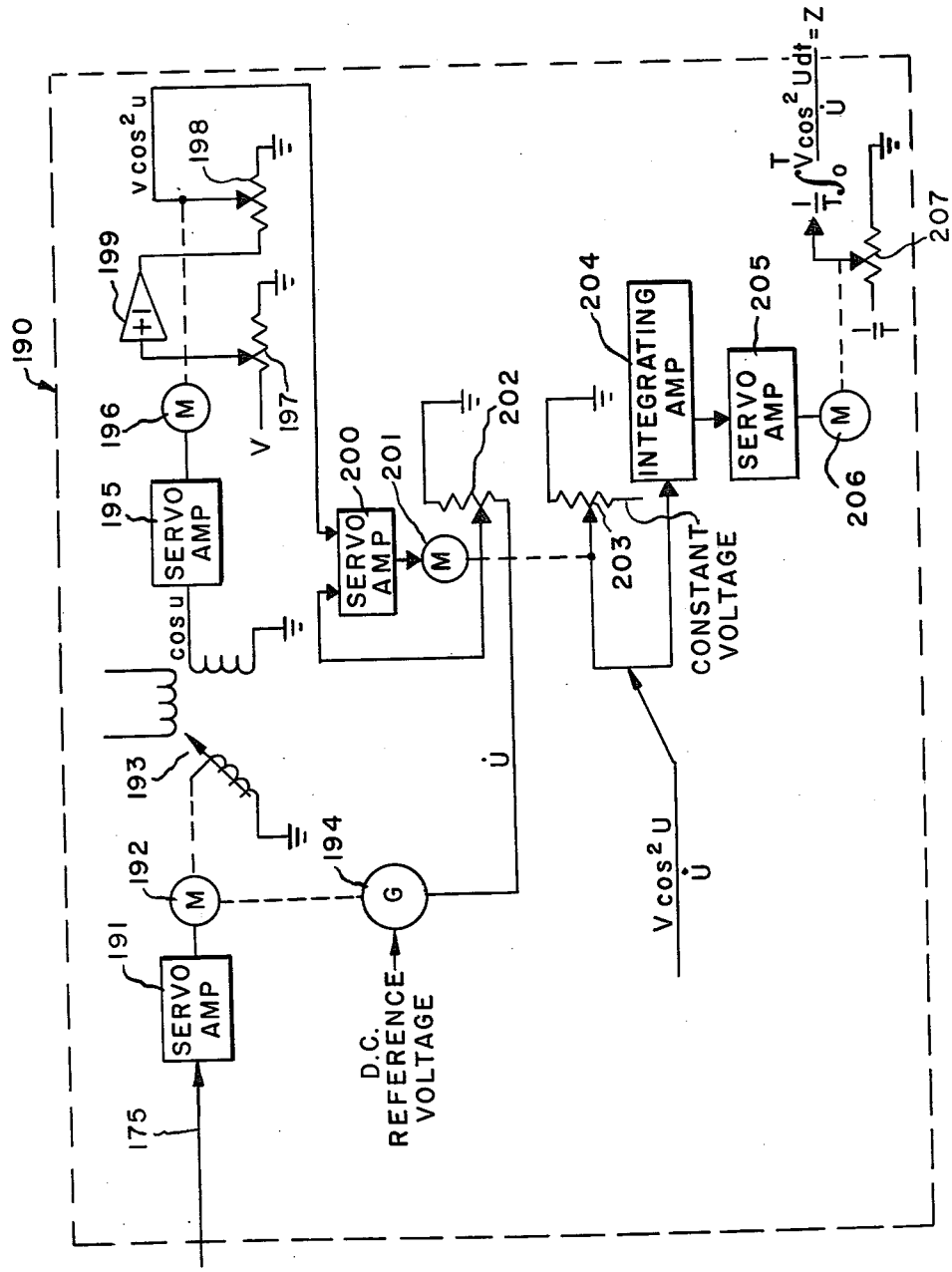
FIGURE 8 is a schematic diagram of one embodiment of the computer of this invention.

Having described above the circuitry by which detector 10 is controlled to provide angle information, reference is now made to the computer embodiment shown schematically in FIGURE 8. Altitude is computed by the circuit of FIGURE 8 in accordance with the following equation:

$$Z = \frac{1}{T} \int_0^T \frac{V \cos^2 u \, dt}{\dot{u}}$$

where $Z$ = altitude $T$ = Effective interval of intergration $V$ = velocity $u$ = pitch axis angle $\dot{u} = \frac{du}{dt}$ = time rate of change of angle $u$ The operation of the circuit of FIGURE 8 in computing altitude is as follows. The voltage applied to computer 190 by lead 175 is a voltage proportional to the pitch angle $u$ of detector 10. This voltage drives a servo amplifier 191 which positions the rotor of a motor 192 in accordance with the value of the pitch angle voltage $u$.

Motor 192, in turn, positions both the rotor of a resolver 193 and the rotor of generator 194. For a discussion of resolvers see Radiation Laboratory Series, vol. 17, beginning at Section 10.12. The output of resolver 193 is a voltage proportional to the cosine of the pitch angle, cos $u$, and, when applied to a second servo amplifier 195, the rotor of motor 196 is driven to a position corresponding to the cosine function of angle $u$. Connected to motor 196 are two potentiometers, 197 and 198, whose electrical circuits are so arranged that the output of potentiometer 197 is the exciting voltage of potentiometer 198. The exciting voltage to potentiometer 197 is a voltage proportional to ground velocity, $V$ in the formula, and is obtained from a source external to the altitude determining system of this invention. Motor 196 drives potentiometers 197 and 198 to a position corresponding to cos $u$ and, since the voltage to potentiometer 197 is the velocity voltage $V$, its output voltage to potentiometer 198 is $V \cos u$ and the output voltage from potentiometer 198 is $V \cos^2 u$. An isolating amplifier 199 is connected in the circuit between potentiometers 197 and 198 to reduce loading effects on potentiometer 197.

The output from potentiometer 198, $V \cos^2 u$, is applied to the input of a third servo amplifier 200 which, in turn controls the rotor of a motor 201. Servo mechanism 200, 201, 202 differs from servo mechanisms 191, 192 and 195, 196 in the way its feed-back potentiometer 202 is excited. Instead of a feed-back voltage derived from the rotor positions of motors 192, 196 to thus balance the input voltage and null the servo amplifiers 191, 195, the feed-back of servo amplifier 200 is from potentiometer 202 excited by the output voltage from generator 194, as represented by the symbol $\dot{u}$. This output voltage of generator 194 is proportional to the angular velocity of its rotor as driven by motor 192 and is, therefore, proportional to the time rate of change of the pitch angle $u$. As a result, the rotor of motor 201 assumes a position corresponding to the input voltage to servo amplifier 200 divided by the rate generator voltage which, in terms of the equation, is $$\frac{V \cos^2 u}{\dot{u}}$$

Potentiometer 203 is driven by motor 201 and has a constant voltage applied thereto so that the expression of the equation, $$\frac{V \cos^2 u}{\dot{u}}$$

is obtained as a proportion of the constant voltage. This voltage is fed to integrating amplifier 204 and the output of amplifier 204 drives a fourth servo amplifier 205, similar in type to servo amplifiers 191 and 195. Motor 206 connected to servo amplifier 205 positions potentiometer 207 so as to produce a voltage proportional to the altitude $Z$. This last mentioned potentiometer in the computer is excited by a voltage proportional to the reciprocal of the effective interval of integration and the output of the potentiometer is, thus, in terms of the complete equation. This voltage is fed to an appropriate read out means (not shown) whereby the voltage may be read in feet or otherwise utilized as a voltage representative of altitude.

Alternative to the computer of FIGURE 8, altitude may be computed directly as a measure of the time required for detector 10 to rotate through a given pitch angle $u$. The most simple form of such a computer is in the case of time measured by pitch angle $u$ of 45° and is the computer embodiment shown by FIGURE 9. In FIGURE 9, altitude is computed by the formula:

$$D = Vt = Z$$

where $D$ = distance
$V$ = velocity
$t$ = time measured over a pitch angle of 45°
$Z$ = altitude Of course, altitude can be computed by measuring times over pitch angles other than an angle of 45° and in such instances, a tangent function will be introduced as a divisor into the above equation and additional components will be required in the computer embodiment of FIGURE 9.

As shown in FIGURE 9, constant frequency pulse generator 220 is connected by lead 174 to gate circuit 173. When a source of radiation is detected and a pulse is applied to bi-stable circuit 171 (shown in FIGURE 7) to change its conductive state, gate circuit 173 is opened by signals applied through lead 172. With gate 173 open, constant frequency pulses from generator 220 are applied to condenser 221 for the period of time required for detector 10 to follow the infrared radiation source over a pitch angle of 45°. Each pulse increases the charge on condenser 221 but it should be recognized that the consequent voltage on condenser 221 is small in comparison with the pulse voltage so that the pulses are not bucked by an appreciable opposing voltage. At a pitch angle of zero (0°) degree, a pulse to circuit 171 flips it to the non-conductive state and gate 173 is closed. When gate 173 closes, the voltage of condenser 221 is a voltage proportional to time and is discharged to servo amplifier 222. Servo amplifier 222 drives the rotor of motor 223 which, in turn, positions the wiper arm of potentiometer 224. The exciting voltage to potentiometer 224 is velocity in volts derived separately from another source. Thus, the output from the potentiometer is the voltage product of $V$ in volts and $t$ in volts and is, of course, equal to the altitude $Z$. This voltage may be applied to read-out (not shown) calibrated in feet or to some other means wherein the altitude in voltage form may be used.

As has been shown in the above description, the method and apparatus of the present invention is subject to considerable choice in such matters as circuits, components, methods of computation, wavelengths of energy to be detected, and others. Therefore, any such changes or modifications as fall within the scope of the appended claims are intended to be and are claimed as part of this invention.

We claim:
1. A method for determining the altitude of a vehicle comprising directing an energy detector toward a source of radiant energy, maintaining the detector so directed through a period of movement of said vehicle by pivotal movement about a pitch axis and a roll axis, generating a signal indicative of the movement of said detector about said pitch axis, receiving a signal indicative of the horizontal velocity of said vehicle and generating a signal representative of the altitude of said vehicle in response to said signals.

2. A method for determining the altitude of a vehicle as defined in claim 1 which includes the step of pivoting said detector about said roll axis to locate a source of radiant energy.

3. A method for determining the altitude of a vehicle that comprises directing an energy detector toward a source of radiant energy, maintaining the indicator so directed through a period of time required for said energy detector to move through a given vertical angle with the horizontal, generating a signal which is a function of said period of time, receiving a signal which is a function of the horizontal velocity of said vehicle, and generating a voltage representative of the altitude of said vehicle in response to said signals.

4. A method for determining the altitude of a vehicle as defined in claim 3 which includes the step of pivoting said detector about a roll axis to locate a source of radiant energy.

5. An apparatus for determining the altitude of a vehicle comprising means producing an indication of the horizontal velocity of said vehicle, a detector of radiant energy, means pivotably mounting said detector to permit movement at least about a pitch axis, means responsive to a signal from said detector controlling said detector to follow a source of radiant energy, means producing a time function indication of the angle of movement of said detector about said pitch axis, means producing a trigonometric function of the angle of movement of said detector about said pitch axis, and means receiving said indication of horizontal velocity of said vehicle, said trigonometric function and said time function indication and computing therefrom the altitude of said vehicle.

6. An apparatus for determining the altitude of a vehicle comprising means producing an indication of the horizontal velocity of said vehicle, a detector of radiant energy, means pivotably mounting said detector to permit movement about a pitch axis and about a roll axis, means responsive to a signal from said detector for controlling the movement of said detector about said pitch and roll axes so as to follow a source of radiant energy, means producing a signal indicative of the movement of said detector about said pitch axis as said detector is controlled to follow said source and means receiving said indication of the horizontal velocity of said vehicle and said signal indicative of the movement of said detector and computing therefrom the altitude of said vehicle.

7. An apparatus for determining the altitude of a vehicle comprising means producing an indication of the horizontal velocity of said vehicle, a detector of radiant energy, means pivotably mounting said detector for movement about a pitch axis and about a roll axis, torque producing means interconnecting said detector and said mounting means to cause movement of said detector about said pitch axis and said roll axis, control means responsive to a signal from said detector providing signals to said torque producing means whereby said detector is controlled to move about said pitch and roll axes and thus follow a source of radiant energy, means producing a signal indicative of the angle of movement of said detector about said pitch axis as said detector is controlled to follow said source, and means receiving said indication of the horizontal velocity of said vehicle and said signal indicative of the angle of movement of said detector about said pitch axis and computing therefrom the altitude of said vehicle.

8. An apparatus for determining the altitude of a vehicle comprising a means producing an indication of the horizontal velocity of said vehicle, a detector of radiant energy, means pivotably mounting said detector for movement about a pitch axis and a roll axis, torque producing means interconnecting said detector and said mounting means to cause movement of said detector about said pitch axis and said roll axis, means controlling said torque producing means to cause said detector to pivot about said roll axis and scan in a plane at an angle about said pitch axis prior to the detection of radiant energy, means responsive to a signal from said detector providing signals to said torque producing means to control said detector to follow said source of radiant energy, means producing a signal indicative of the angle of movement of said detector about pitch axis as said detector is controlled to follow said source, and means receiving said indication of the horizontal velocity of said vehicle and said signal indicative of said angle of movement of said detector and computing therefrom the altitude of said vehicle.

9. An apparatus for determining the altitude of a vehicle as defined in claim 7 wherein said computing means derives a time function as the time rate of change of said angle measurement.

10. An apparatus for determining the altitude of a vehicle as defined in claim 8 wherein said computing means derives a time function as the time required for said angle measurement to reach a predetermined value.

11. An apparatus for determining the altitude of a vehicle as defined in claim 8 wherein radiant energy is optically modulated in said detector by spinning a mirror assembly on an axis displaced from the optical axis of said detector.

12. An apparatus for determining the altitude of a vehicle as defined in claim 11 wherein a radiation chopping reticle and a radiation modulating reticle comprise a portion of the optical system of said detector.

13. An apparatus for determining the altitude of a vehicle as defined in claim 11 wherein said detector is gyroscopically mounted.

14. The method for determining the altitude of a vehicle that comprises mounting an energy detector for pivotal movement about the pitch axis and roll axis of said vehicle, pivoting said detector about said roll axis to cause said detector to scan a plane at an angle to said pitch axis until a source of radiant energy is detected, maintaining said detector so directed through a period of movements of said vehicle, generating a first signal indicative of the movement of said detector with respect to said pitch axis, receiving a second signal indicative of the horizontal velocity of said vehicle, generating a third signal as a trigonometric function of said first signal, combining said third signal and said second signal to generate a fourth signal, generating a fifth signal indicative of the change with respect to time of the movement of said detector relative to said pitch axis, combining said fourth signal and said fifth signal to produce a sixth signal, and subjecting said sixth signal to an integrating network to obtain a signal indicative of the altitude of the vehicle.

15. An apparatus for determining the altitude of a vehicle that comprises a detector of radiant energy, means pivotably mounting said detector for movement about a pitch axis and a roll axis, first control means responsive to lack of signal from said detector to cause said detector to pivot about said roll axis to scan a plane at an angle with said pitch axis, second control means responsive to a signal from said detector to cause said detector to follow a source of radiant energy, first servo means producing a signal indicative of the angular movement of said detector about said pitch axis, second servo means responsive to the output of said first servo means and a received signal indicative of the horizontal velocity of said vehicle for producing a signal that is a trigonometric function of said angular movement, third servo means responsive to the output of said first servo means for producing a signal that is a function of the time rate of change of said angular movement, fourth servo means responsive to the outputs of said second and third servo means, and means for integrating the output of said fourth servo means to obtain a signal indicative of the altitude of said vehicle.

References Cited in the file of this patent

UNITED STATES PATENTS

| 1,157,468 | Von Eberhard | Oct. 19, 1915 |
| 2,070,178 | Pottenger et al. | June 6, 1934 |
| 2,740,961 | Slater | Apr. 3, 1956 |
| 2,762,123 | Shultz et al. | Sept. 11, 1956 |
| 2,882,416 | Fairbanks et al. | Apr. 14, 1959 |

OTHER REFERENCES

Cugle's Practical Navigation by Charles H. Cugle, 6th edition, E. P. Dutton and Co., Inc., New York, 1952; pages 379–383 are relied on.